United States Patent
Lee

(10) Patent No.: US 10,304,119 B2
(45) Date of Patent: May 28, 2019

(54) METHOD AND SYSTEM FOR PROCESSING FOOD ORDERS

(71) Applicant: 365 Technologies Holding Limited, Hong Kong (HK)

(72) Inventor: Y Chung Lee, Hong Kong (HK)

(73) Assignee: 365 Technologies Holding Limited, Hong Kong (HK)

( * ) Notice: Subject to any disclaimer, the term of this patent is extended or adjusted under 35 U.S.C. 154(b) by 735 days.

(21) Appl. No.: 14/831,858

(22) Filed: Aug. 20, 2015

(65) Prior Publication Data

US 2016/0063473 A1 Mar. 3, 2016

Related U.S. Application Data

(60) Provisional application No. 62/042,803, filed on Aug. 28, 2014.

(51) Int. Cl.
*G06Q 30/06* (2012.01)
*G06Q 20/32* (2012.01)
*G06Q 50/12* (2012.01)

(52) U.S. Cl.
CPC ..... *G06Q 30/0633* (2013.01); *G06Q 20/3224* (2013.01); *G06Q 50/12* (2013.01)

(58) Field of Classification Search
CPC ........... G06Q 30/0633; G06Q 20/3224; G06Q 20/20; G06Q 50/12
USPC ...................................................... 705/15, 16
See application file for complete search history.

(56) References Cited

U.S. PATENT DOCUMENTS

| | | | | |
|---|---|---|---|---|
| 9,240,006 | B2* | 1/2016 | White | G06Q 20/204 |
| 2005/0114185 | A1* | 5/2005 | Rodriguez | G06Q 10/02 |
| | | | | 705/5 |
| 2011/0320293 | A1* | 12/2011 | Khan | G06Q 20/0457 |
| | | | | 705/16 |
| 2012/0136754 | A1* | 5/2012 | Underwood | G06Q 30/06 |
| | | | | 705/26.43 |
| 2015/0294292 | A1* | 10/2015 | Michishita | G06Q 50/12 |
| | | | | 705/15 |

FOREIGN PATENT DOCUMENTS

| | | |
|---|---|---|
| CN | 101556674 A | 10/2009 |
| CN | 101689223 A | 3/2010 |

(Continued)

OTHER PUBLICATIONS

Search Report issued by the Chinese Patent Office dated Apr. 30, 2015.

(Continued)

*Primary Examiner* — Florian M Zeender
*Assistant Examiner* — Christopher R Buchanan

(57) ABSTRACT

A method for food order processing includes: determining a user's current location; determining a food preparation premise based on the user's current location; displaying dishes associated with the food preparation premise and allowing the user to make a selection from the dishes; allowing the user to place an order based on the selection; determining whether the order is associated with a table ID; and processing payment associated with the order. If the order is determined to be not associated with a table ID, the method further includes matching a table ID with the order. A system for food order processing is also provided.

20 Claims, 6 Drawing Sheets

(56) References Cited

FOREIGN PATENT DOCUMENTS

| CN | 102567804 A | 7/2012 |
|----|-------------|---------|
| CN | 102855572 A | 1/2013 |
| CN | 103246720 A | 8/2013 |
| CN | 103279682 A | 9/2013 |
| CN | 103455846 A | 12/2013 |
| CN | 103606117 A | 2/2014 |
| CN | 103617580 A | 3/2014 |

OTHER PUBLICATIONS

Search Report of counterpart Hong Kong Short-term Patent Application No. 15108343.0 dated Sep. 25, 2015.
International Search Report of PCT Patent Application No. PCT/CN2015/087576 dated Oct. 29, 2015.

* cited by examiner

METHOD AND SYSTEM FOR PROCESSING FOOD ORDERS

CROSS-REFERENCE TO RELATED APPLICATIONS

This application claims the benefit of U.S. provisional patent application No. 62/042,803 filed on Aug. 28, 2014; the contents of which is hereby incorporated by reference.

FIELD OF THE PATENT APPLICATION

The present patent application generally relates to information technologies and more specifically to a method and a system for processing food orders.

BACKGROUND

Often, especially in busy restaurants, patrons have to wait to be served and for their orders to be placed. It is desired to provides better experience and convenience to patrons and restaurants, and enhance efficiency of the food ordering process.

SUMMARY

The present patent application is directed to a method and a system for processing food orders. In one aspect, the method for food order processing includes: determining a user's current location; determining a food preparation premise based on the user's current location; displaying dishes associated with the food preparation premise and allowing the user to make a selection from the dishes; allowing the user to place an order based on the selection; determining whether the order is associated with a table ID; and processing payment associated with the order. If the order is determined to be not associated with a table ID, the method further includes matching a table ID with the order; if the user's current location is determined to be a remote site, the method further includes searching for a food preparation premise; if the user's current location is determined to be a restaurant, the method further includes matching a location identifier of the restaurant with a food preparation premise. The step of processing payment associated with the order includes determining whether the user chooses to make payment at a cashier register; if yes, choosing an electronic method or cash for the payment method; and if not, scanning a QR code, confirming details of the order, and proceeding to complete the payment at a kiosk.

The step of matching a location identifier of the restaurant with a food preparation premise may include scanning a QR code that is associated with the restaurant, and identifying the food preparation premise based on the QR code. The step of matching a location identifier of the restaurant with a food preparation premise may further include associating a table ID specified in the QR code with a shopping cart.

The step of searching for a food preparation premise may include retrieving the user's current location by GPS detection, pre-stored geocodes of addresses saved in a user's address list, or keywords. The step of searching for a food preparation premise may further include assigning filters to results returned. The method may further include locking the order to finalize the order to be paid after the user confirms the details of the order.

In another aspect, the present patent application provides a method for food order processing that includes: determining a user's current location; determining a food preparation premise based on the user's current location; displaying dishes associated with the food preparation premise and allowing the user to make a selection from the dishes; allowing the user to place an order based on the selection; determining whether the order is associated with a table ID; and processing payment associated with the order. If the order is determined to be not associated with a table ID, the method further includes matching a table ID with the order.

If the user's current location is determined to be a remote site, the method may further include searching for a food preparation premise. If the user's current location is determined to be a restaurant, the method may further include matching a location identifier of the restaurant with a food preparation premise. The step of matching a location identifier of the restaurant with a food preparation premise may include scanning a QR code that is associated with the restaurant, and identifying the food preparation premise based on the QR code. The step of matching a location identifier of the restaurant with a food preparation premise may further include associating a table ID specified in the QR code with a shopping cart.

The step of searching for a food preparation premise may include retrieving the user's current location by GPS detection, pre-stored geocodes of addresses saved in a user's address list, or keywords. The step of searching for a food preparation premise may further include assigning filters to results returned.

The step of processing payment associated with the order may include determining whether the user chooses to make payment at a cashier register; if yes, choosing an electronic method or cash for the payment method; and if not, scanning a QR code, confirming details of the order, and proceeding to complete the payment at a kiosk. The method may further include locking the order to finalize the order to be paid after the user confirms the details of the order.

In yet another aspect, the present patent application provides a system for food order processing. The system includes: means for determining a user's current location; means for determining a food preparation premise based on the user's current location; means for displaying dishes associated with the food preparation premise and allowing the user to make a selection from the dishes; means for allowing the user to place an order based on the selection; means for determining whether the order is associated with a table ID; means for processing payment associated with the order; and means for matching a table ID with the order, if the order is determined to be not associated with a table ID.

The system may further include means for searching for a food preparation premise if the user's current location is determined to be a remote site; and means for matching a location identifier of the restaurant with a food preparation premise, if the user's current location is determined to be a restaurant. The system may further include means for scanning a QR code that is associated with the restaurant, and identifying the food preparation premise based on the QR code; and means for associating a table ID specified in the QR code with a shopping cart.

The system may further include means for retrieving the user's current location by GPS detection, pre-stored geocodes of addresses saved in a user's address list, or keywords. The system may further include means for assigning filters to results returned.

The system may further include means for determining whether the user chooses to make payment at a cashier register; if yes, choosing an electronic method or cash for the payment method; if not, scanning a QR code, confirming details of the order, and proceeding to complete the payment at a kiosk; and means for locking the order to finalize the order to be paid after the user confirms the details of the order.

BRIEF DESCRIPTIONS OF THE DRAWINGS

DETAILED DESCRIPTION

Reference will now be made in detail to a preferred embodiment of the method and the system for processing food orders disclosed in the present patent application, examples of which are also provided in the following description. Exemplary embodiments of the method and the system disclosed in the present patent application are described in detail, although it will be apparent to those skilled in the relevant art that some features that are not particularly important to an understanding of the method and the system may not be shown for the sake of clarity.

Furthermore, it should be understood that the method and the system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
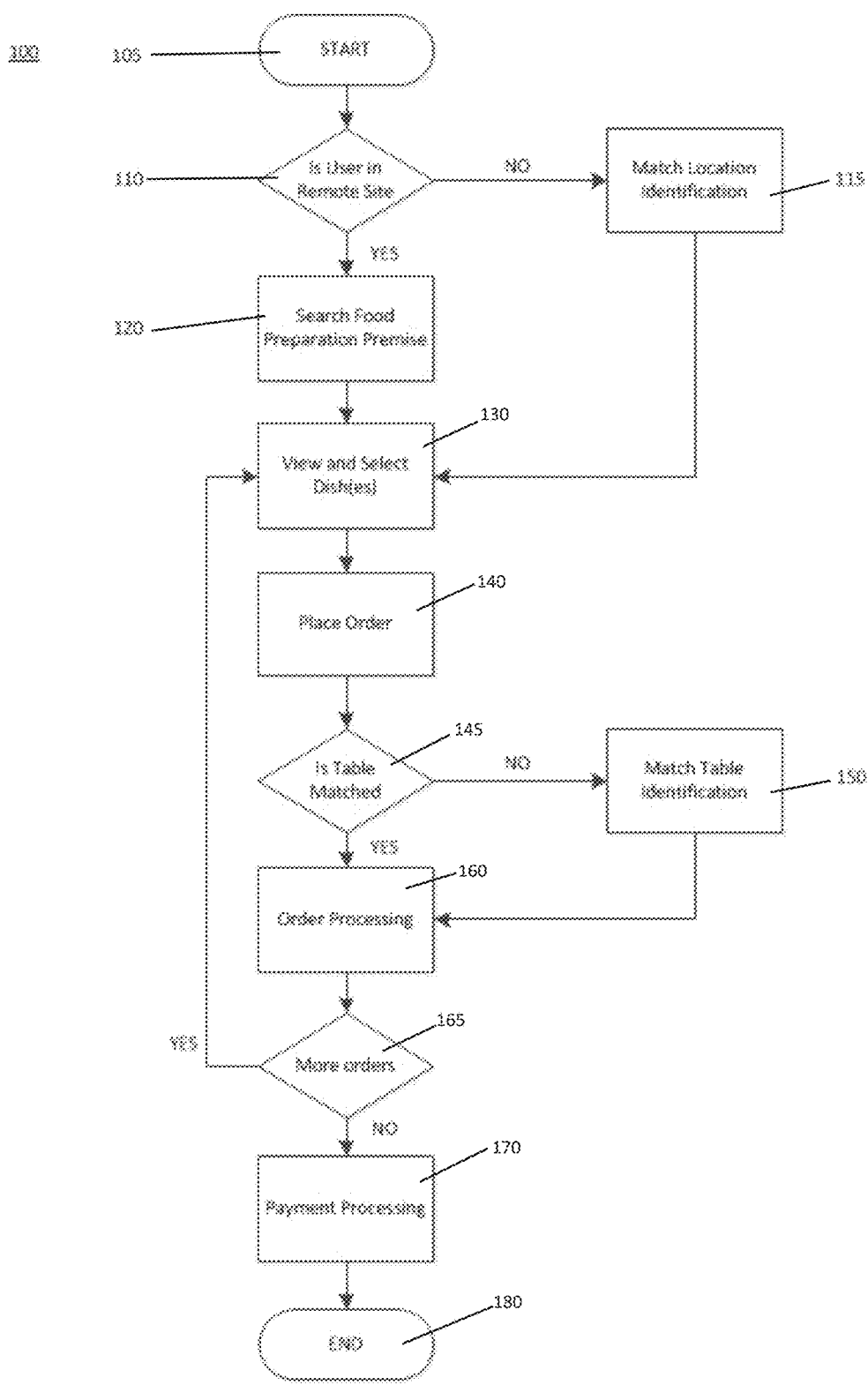
FIG. 1 is a flowchart showing a process of a food order processing system according to an embodiment of the present patent application, which allows a mobile device user to place dine-in food order in a restaurant, a bar or from a remote site in real-time via the mobile device.

FIG. 1 is a flowchart showing a process 100 of a food order processing system according to an embodiment of the present patent application, which allows a mobile device user to place dine-in food order in a restaurant, a bar or from a remote site in real-time via the mobile device. Process 100 includes steps 105-180. Process 100 starts at step 105. All the steps of process 100 can be performed in a system that includes a mobile computer processor or in an application configured to be executed by a computer processor. The application should be installed and stored in a mobile device. Users can start process 100 with the application running on the mobile device by any means of Internet access.

Referring to FIG. 1, step 110 is determining the condition/location of a user, i.e. a patron, whether the patron is at a remote site and intends to go dine-in at a specific restaurant. If the user is at a remote site, then process 100 proceeds to step 120. If the user is in a restaurant, then process 100 proceeds to step 115.

Step 115 is matching a location identifier (includes, but not limited to, printed and electronic identifiers) of the restaurant in the food order processing system with a food preparation premise. The user can use any capturing method to capture the location identifier by any commercially available application. The application can call a web service with the location identifier and redirect the user to the food order processing system. A backend system will then return the corresponding restaurant ID and table ID, if and only if the location identifier is associated with these two IDs. The table ID is temporarily stored in the memory as the user's place preference. Then the user will be directed to the details page of the restaurant according to the restaurant ID returned from the backend system.

Step 120 is searching for food preparation premise data in the food ordering system. The user can request restaurant information from the food order processing system based on search criteria. There are three ways to search for restaurant information.

The first one is by manual input of a location. The user inputs a district name or detailed address of a preferred dine-in location into the system. The system retrieves relevant location information, e.g. a geocode, formatted address, etc., with a third party online map service authority. A list of location suggestion is displayed for the user to view and select. If the user cannot select a proper location from the list, the user can re-type an appropriate district name or detailed address to search for suggestion again. The selected location from the list is stored in the system as a future auto-suggestion.

The second one is using the user's address initially stored in the food order processing system. The user can select one of the addresses from an address list, if available. The system utilizes the backend system to return the corresponding geocode, i.e. longitude, and latitude, as search filter for searching restaurant information. The backend system then returns a list of location suggestion like the first way does.

The third one is utilizing the user's current location, e.g. by assisted-GPS (A-GPS) or GPS. The system sends the corresponding geocode to the backend system as search filter. The backend system will then return a list of location suggestion like the first way does.

To facilitate the restaurant selection, the users can also add more filters, such as restaurant's name, restaurant's address, distance from the search location, cuisine, etc. These filter options are preset in the backend system. The system calls a web service to obtain these filters as process 100 starts. The user's choice of filters will be temporarily stored in the mobile device memory until the user exits the process or resets the filters.

While the user selects a restaurant from the list, the user is redirected to the details page of the restaurant. The system calls a web service to retrieve the restaurant details, e.g. name, address, description, etc. Operation status of the restaurant returned from the backend system will be temporarily stored in the mobile device memory for future condition checking in step 130. If the operation status is "Unregistered", "Suspended", or "Revoked", the system sends a popup message to inform the user that a food menu is not available or it is not able to add dish(es) to shopping cart.

Step 130 is displaying a food menu of the selected restaurant in the food order processing system. When the user enters the restaurant menu page with the mobile device, the system calls a web service to obtain the daily food menu. The system conducts menu caching and filtering with the web service response. The purpose of the menu caching is to improve the user's experience on ordering dishes and reduce redundant network usage. The cached menu data will be removed once the user leaves the restaurant menu page. Since a dish can be time-oriented, only available at a particular period such as lunch time, the menu page is featured with a time-based filtering to ensure the dish is available at the time of ordering. The system conducts the time-based filtering before displaying the menu to the user. In addition, every time the application becomes active from background to foreground and the cache is not yet removed, the local cached menu data still allows the system to display the correct time-oriented menu.

When the user tries to add a dish to the shopping cart, the system checks whether the operation status of restaurant is suspended or revoked. If the operation status is active, the user is then allowed to add the dish to the shopping cart. The user clicks on a particular dish from the menu, the system subsequently redirects the user to the corresponding dish page, normal dish page and bundle dish page, according to the type of dish. The system calls a web service to obtain dish details using the corresponding dish ID. A list of dish's attributes will be returned. The system visualizes these attributes as different input controls, e.g. checkbox, to be selected by the user. The user can select a combination of dish attributes and quantity. The user's choice will be temporarily stored in the memory until the user clicks a "add to cart" button. The dish attributes and remarks of the dish will be sent to the backend systems through another web service to update the current shopping cart information of the user.

Step 140: placing an order in the food order processing system with existing shopping cart items. Once the user has finished adding dishes to the shopping cart, the user can go to "My Cart" page to review the dishes he has ordered. The system calls a web service to obtain all ordered dishes' details from the food order processing system. An order list enables user to further edit the dishes by clicking on the dish name. The dish editing feature brings the user to the dish page and goes through the selection mentioned in step 130. The user can click a checkout button on the system for dine-in mode. The system can check the preferences and see if the table ID is associated with the order. If the order is associated with the table ID, the system calls a web service to proceed with the checkout and redirect the user to the order page in the system.

Step 145 is determining the condition of association between an order and a table ID. If the table ID does not exist, the process 100 proceeds to step 150. If the order is associated with a table ID, process 100 proceeds to step 160.

Step 150 is matching a table ID in the food order processing system with the order. The system requests the user to capture the location identifier. The captured table ID will be passed from the backend system to a web service to obtain table information. After the table information is obtained, the system proceeds to step 160.

Step 160 is processing the order in the food order processing system. The system calls a web service to initiate the checkout process. If the process is successful, the system redirects the user to the order details page for reviewing the order. Otherwise, the system rejects the user's checkout request and sends a popup message to notify the user about the order status. Once the order is successfully placed, the restaurant is notified of the order. The food order processing system can print order slip, kitchen slip, etc. for food preparation process.

Step 165 is checking if further orders are placed by the user. If the user would like to order more dishes after the previous order, then the process 100 proceeds to step 130. If the user does not place order any more, then the process 100 proceeds to step 170.

Step 170 is processing a payment request from the mobile device, charging an amount calculated from the placed order(s). The users can use different kinds of payment method, for example kiosk, to pay their bills. While the order is not yet paid, a QR Code is provided in the order page in the system for the user to pay at a kiosk. The kiosk accepts any payment method, not limited to electronic payment or cash payment. Alternatively, the restaurant can employ manual cash payment if the kiosk payment service is not available. Once the payment is made successfully, the order status will be changed to "completed" in the backend system of the food order processing system. A scheduler can be setup in the order details page on the user's mobile device to check the payment status. The system can call the backend system to get the latest order status for a specific interval.

Figure 2:
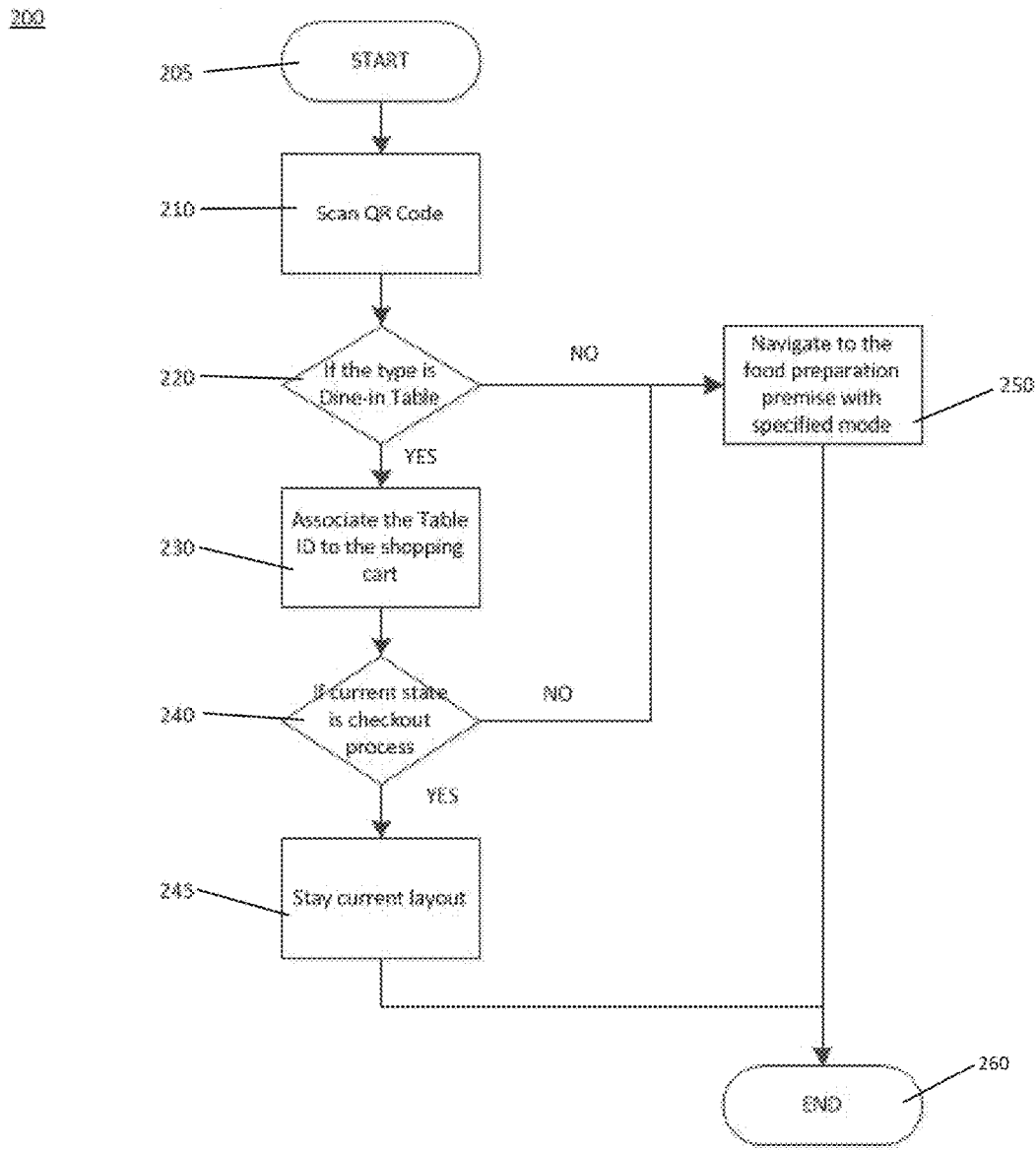
FIG. 2 is a flowchart showing a process of a food order processing system according to an embodiment of the present patent application, allowing a mobile device user to easily look up a food preparation premise with a specified mode based on the form.

FIG. 2 is a flowchart showing a process 200 of a food order processing system, allowing a mobile device user to easily look up the food preparation premise with a specified mode based on the form, e.g. QR code scanning approach.

Process 200 includes steps 205-260. Process 200 starts at step 205. The process should be performed with a mobile device, assuming that an application is installed and stored in the storage of the mobile device. Users can start the process with the application running on the mobile device with any means of the Internet access.

Step 210 is scanning a QR code placed in somewhere inside or outside of the food preparation premises. The QR code is supposed to be registered at the food order processing system through a merchant application. In this way, the food preparation premise is able to indicate its available service mode in the QR code. In addition to the dine-in mode, the QR code can be associated with the table ID so that the system can indicate at which table in the food preparation premise the order is placed by the user. The user can scan the QR code when the system requests the user to indicate which food preparation premise to proceed with ordering. The system sends the QR code data to a web service, and expects a response conveying the data of identity of food preparation premise, service mode indicated and/or the table ID. These data are used for application flow with layout changed and/or facilitating the checkout process.

Step 220 is determining the type of QR code whether it is dine-in mode. If the QR code is recognized as dine-in mode specifying the table ID, then process 200 proceeds to step 230. If the QR code is recognized as other service mode, then process 200 proceeds to step 250.

Step 230 is associating the table ID to current shopping cart. After the web service calls to the server with the QR code scanned, the server then validates the shopping cart, whether it is associated with the table ID as specified in the QR code data (if the QR code indicates dine-in service mode). The validation mainly checks against mismatch of restaurant with the table and redundant tables associated with multiple orders. It is noted that the server and local system also store the table ID at the shopping cart.

Step 240 is determining current state of the checkout process. If the user has already gone through the checkout process with the existing shopping cart, then the process 200 proceeds to step 245. If the user has not gone through the checkout process, then the process 200 proceeds to step 250.

Step 245 is staying with the current layout to keep doing the checkout process. The system should display the associated table ID instead.

Step 250 is navigating the food preparation premise with specified mode. The system layout will be changed to the details page of food preparation premise with specified mode, i.e. takeout, queuing, and self-serve. It enables the user to navigate food preparation premise information directly with a mobile device but without too many steps to look up a restaurant in certain mode.

Figure 3:
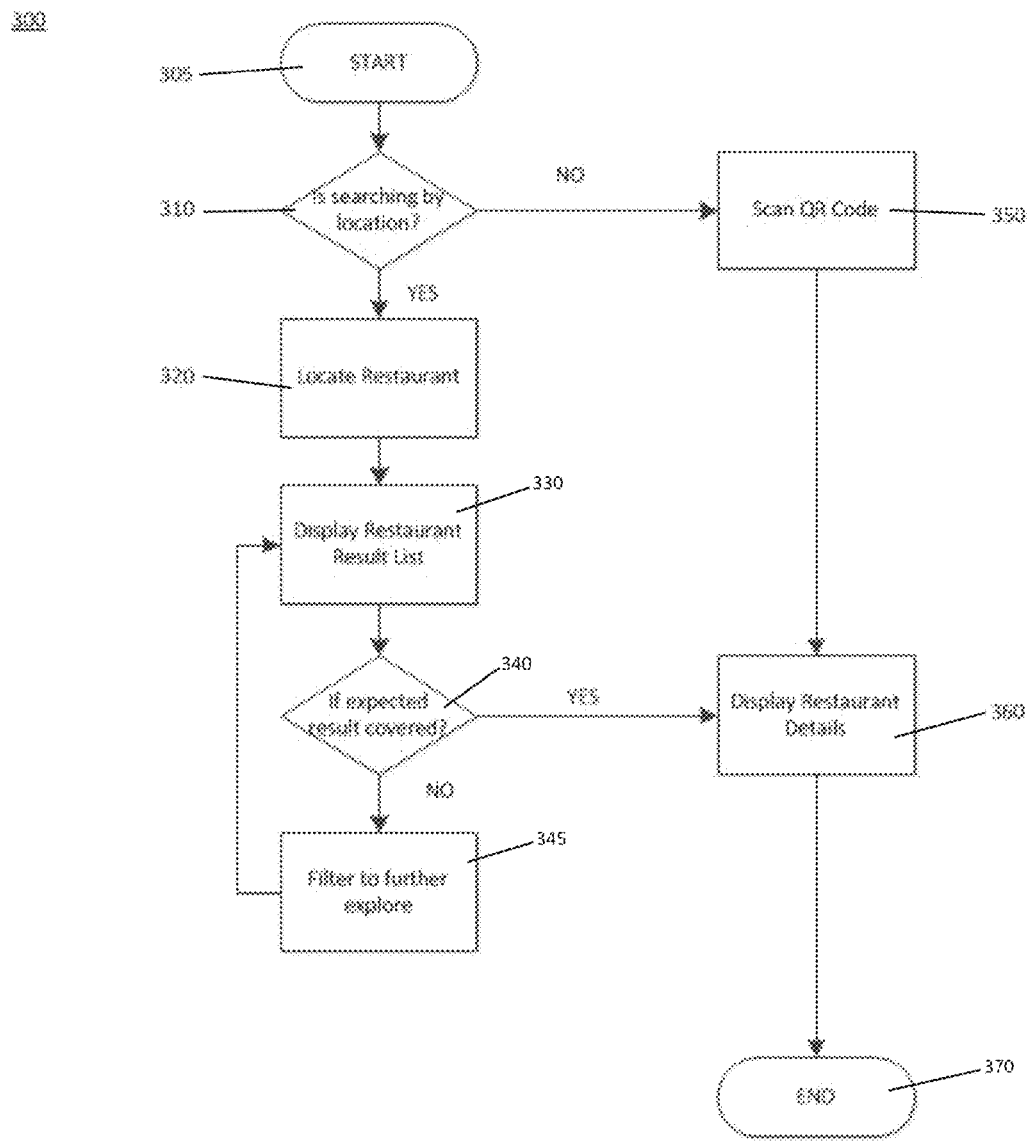
FIG. 3 is a flowchart showing a process in a food order processing system according to an embodiment of the present patent application, allowing a mobile device user to further process searching activities for preferred food preparation premises.

FIG. 3 is a flowchart showing a process 300 in a food order processing system, allowing a mobile device user to further process the searching activities for preferred food preparation premises.

Process 300 includes steps 305-370. Process 300 starts at step 305. All the steps of process 300 can be performed in a system including a mobile computer processer or in an application configured to be executed by a computer processor.

Step 310 is determining the search criteria of food preparation premises. The system uses an indicated location reference to search for corresponding restaurant. If the user chooses to search food preparation premises by location, then process 300 proceeds to step 320. If the user alternatively chooses a shortcut by scanning QR code, then the process 300 proceeds to step 350.

Step 320 is locating the restaurant reference as searching condition in various ways. The user can use any commercially available application in the mobile device to obtain location reference, geocode, by GPS technology. The geocode includes latitude and longitude for the server-side's calculation based on the shortest distance to corresponding food preparation premises. The user has three ways to indicate the location reference either by current location with GPS detection, pre-stored geocodes of addresses saved in the user's address list, or place's keywords to retrieve the geocode. To make sure the geocode consistency, all geocode required functions are retrieved from the Google Maps API, as an example.

Step 330 is displaying restaurant result list based on the provided geocode in step 320. After the user chooses the way of searching location reference, the geocode will be requested by the food order processing system or Google Service. When the system receives a web service request to look up corresponding food preparation premises according to the location reference, the web service controller subsequently sends a request to search server (Apache Solr) to query food preparation premises with default filter information, i.e. all cuisine, all service mode, and default 2 km distance. The search server applies the algorithm of the distance filtering.

1 digit of Latitude=111.2 km==>1 km= 0.0089928057553957 digit Latitude
1 digit of Longitude=102.9 km==>1 km= 0.0097181729834791 digit Longitude If the request is finding the restaurant within 2 km, the solr parameter on the URL is http://domain/searchserver/restaurant/select?q=lat[{requestLat}−2*0.0089928057553957 TO {requestLat}+2*0.0089928057553957] AND lon:[{requestLon}−5*0.0097181729834791 TO {requestLon}+2*0.0097181729834791]

The result list from search server includes the restaurant unique primary key, geocode and food preparation premises membership type, meeting the criteria of square distance coverage. By utilizing the given list, the web server then applies the below radius coverage algorithm to look up the result list from the origin to further filter a circle zone.

Double earthRadius=Double.valueOf(6371);//km
Double dLat=Math.toRadians(nLat-oLat);
Double dLng=Math.toRadians(nLong-oLong);
Double a=Math.sin(dLat/2)*Math.sin(dLat/2)+Math.cos (Math.toRadians(oLat))*Math.cos(Math.toRadians (nLat))*Math.sin(dLng/2)*Math.sin(dLng/2);
Double c=2*Math.a tan 2(Math.sqrt(a), Math.sqrt(1−a));
Double dist=earthRadius*c;
return dist;

After reviewing the distance double value returned, a finalized list is ready for returning as a web response to the system, providing names of food ordering premises, addresses, distances, and ratings.

Step 340 is determining if the finalized list covers the user's expected results. If the user finds that one or more restaurant meet his expectation, then the process 300 proceeds to step 360. If the user finds that no result meets his expectation, then the process 300 proceeds to step 345.

Step 345 is assigning more filters to further explore the latest result list. The user can add cuisine types with multiple selections, e.g. distance for the radius range, keywords of restaurant name, dish name and address, as well as sorting features, e.g. distance, rating, average expenditure and minimum charge, to narrow down the result list.

Step 350 is looking up the specific food preparation promise with the associated location identity or dining table by scanning the QR code as shortcut. The food preparation promise can place a QR code on the table and allow users to directly use mobile device to scan the QR code aiming to quickly locate the restaurant identity. The restaurant should incorporate table number and restaurant identity into the unique QR code assigned by QR code provider, with the restaurant's mobile tablet and merchant application. The QR code can then indicate the restaurant identity for displaying the restaurant details.

Step 360 is displaying the food preparation premise's details according to the restaurant identity selected or indicated by search result list or QR code shortcut. Details is divided into four sections, namely general information (e.g. restaurant logo, name, business hours, customer rating, average expenditure grading, cuisine types, address, phone number, minimum charge, delivery fee, and takeout options), food menu showed by categories (each category contains a list of dishes, and may include customized options), coupons (e.g. name, terms & condition, effective period, offer and condition description) and customer comments. To better deliver the food menu with complicated structure to the user, the web service for obtaining menu triggers the search server to get all category unique identifiers of a single restaurant in very short response time compared to the database. These category unique identifiers are then used as criteria to retrieve the details from database, such as names and descriptions. After that, the search server is then asked for all product unique identifiers and subsequently put themselves as criteria to retrieve product details, e.g. name, description, referenced bundle product component, from the database. At last, these category and product information are constructed as a formatted JSON string. If it is not stored into the Redis key-value store for quicker access without previous data processing, the constructed JSON string will be stored with the restaurant code to facilitate further food menu request to the same restaurant. While there is product item or category item changed, the Redis key-value will be removed for data consistency concern. Therefore, the user can only retrieve the up-to-date food menu.

Figure 4:
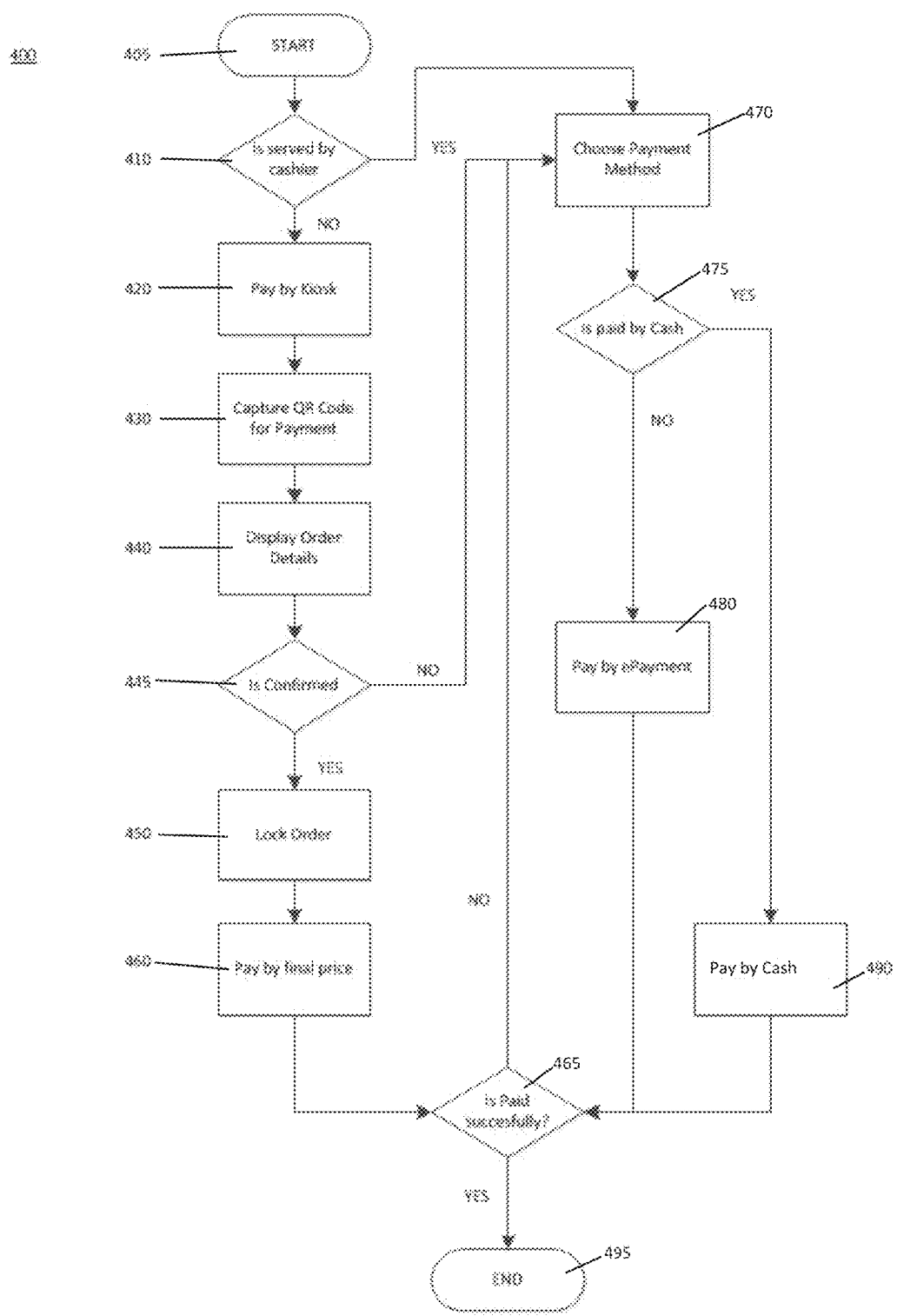
FIG. 4 is a flowchart of a process performed by a food order processing system according to an embodiment of the present patent application, allowing a mobile device user to process payment after the dine-in order has been completed in a restaurant or a bar.

FIG. 4 is a flowchart of a process 400 performed by a food order processing system, allowing a mobile device user to process payment after the dine-in order has been completed in a restaurant or a bar.

Process 400 includes steps 405-495. Process 400 starts at step 405. All the steps of process 400 can be performed in a system including a mobile computer processer or in an application configured to be executed by a computer processor. Additionally, the process 400 should involve payment machines of the restaurant, i.e. kiosk, and mobile tablet device with merchant application. Users can start the process with the application running on the mobile device by any means of the Internet access.

Step 410 is determining the condition of payment handler of the dine-in order. It depends on whether the restaurant offers both mobile tablet payment service and kiosk payment service, or cashier register with tablet payment service only. If the user wants to make payment at a cashier register, then process 400 proceeds to step 470 for choosing either traditional electronic method or cash for the payment.

Step 470 is choosing one of the payment methods at the cashier register. It is not limited to electronic payment at a customer mobile device, electronic payment terminal or cash method. The restaurant should use the merchant application with tablet device to process the payment.

Step 475 is determining whether the payment is paid by cash. If the user chooses the cash payment method, then process 400 proceeds to step 480.

Step 490 is processing the payment of the dine-in order by cash to the user. When the user presents the order page on his mobile device, the cashier will then check the order number placed on the user's mobile application. From the usage of merchant application, the cashier can select the specific dine-in order by order number to display the entire order details, such as order date and time, order items and quantities, sub-total amount of the order, and total amount of the order. It advises both the restaurant and the user on the total amount to be paid by further selected payment method based on the calculation from order details, i.e. unit price of food item multiply with the quantity, and sum up all sub-total amount with any additional surcharge. After the cashier receives the cash, the cashier should do the changes if needed and subsequently updates the order status as "completed" and payment method "cash" in the mobile tablet with merchant application.

Step 480 is processing the payment of the dine-in order by one of the electronic payment methods. When the user presents the order page on his mobile device with the customer application, the cashier will then check the order number placed on the user's mobile application. From the merchant application, the cashier can select the specific dine-in order by order number to display the entire order details, such as order date and time, order items and quantities, sub-total amount of the order, and total amount of the order. It advises both the restaurant and the user on the total amount to be paid by further selected payment method based on the calculation from order details. The user can separately pay the bill by one of accepted electronic payment method through a third party payment gateway terminal provided by the merchant. After the cashier confirms that the electronic payment method is in excess or exactly the same as the order's total amount, the cashier can subsequently update the order status as "completed" and payment method, e.g. "Visa Card", in the mobile tablet with merchant application.

Step 420 is processing the payment of the dine-in order at a multi-function kiosk provided by the restaurant which accepts the self-serve checkout. If the user intends to make the payment without being served by the cashier, the user can make electronic payment at the kiosk. When the user checks at the kiosk, the user can choose the payment mode by touching the screen of the kiosk. The kiosk consists of several peripheral devices to go through the entire checkout process, namely barcode scanner, receipt printer, touch screen, the food order processing system's kiosk client side and payment gateway device.

Step 430 is capturing the QR code for payment at kiosk. The customer is required to navigate the page of the order details to present the QR code for the checkout. This QR code contains encrypted information including, but not limited to, order number. It is generated by the server of the food order processing system with its own private key, which makes sure that the order information is only readable by authorized parties. Note that the public key and private key are held by the server only. And the kiosk starts scanning the QR code as the user presents the QR code to the barcode reader by holding screen showing the QR code in the Order Detail Page.

Step 440 is displaying order details for confirming the payment to be made. After the QR Code is successfully captured, the kiosk subsequently sends a web service request to the food order processing system with the encrypted message captured by QR code scanner. The food order processing system returns the order details after the authentication check against the kiosk. Then the kiosk retrieves the content of order details, including order SKU, name, SKU quantity, remarks, special instruction, total price, order-level discount. The kiosk then retrieves these order details and displays on the screen. It provides enough dine-in order information for the user to confirm whether the food items are ordered by the user's mobile device before the payment.

Step 445 is determining whether the order details are confirmed by the customer for going through further payment process. If the user confirms the order details for payment, then the user can touch the confirm button and process 400 proceeds to step 450.

Step 450 is locking the order to finalize the order to be paid. After the user confirms the details of the order to be paid, the kiosk then makes a web service call to the food order processing system to lock the order and finalize the total amount to be paid. For the lock mechanism, the food order processing system will put a lock to the order. Any order update request to the order should check whether the lock exists before the update action takes place. The lock mechanism prevents the user from adding any items before the kiosk is ready to pay via the payment gateway. It makes sure that the kiosk receives the payment with the finalized amount rather than the outdated one.

Step 460 is processing the payment of the dine-in order by electronic payment method to the user with final order price amount. While the kiosk gets the finalized amount, it will hold a screen to wait for the user to proceed with the specific electronic payment method, such as IC card and NFC card. Note that there is a 30-second timeout mechanism to proceed with the payment method capturing process. If the process is timeout, the kiosk screen will show the payment failure page and turn back to initial kiosk payment mode. Otherwise, it still detects the payment token information to proceed with the online authorization and authentication payment request to the payment gateway server.

Step 465 is determining whether the payment is successfully made through corresponding payment method. If the payment is not made, the kiosk screen will show the payment failure page and turn back to initial kiosk payment mode, and the user should proceed to step 470 to choose payment method to go through the payment process with same or different payment method. If the payment is made successfully, it will show a page of the payment details and end the entire payment process.

Figure 5:
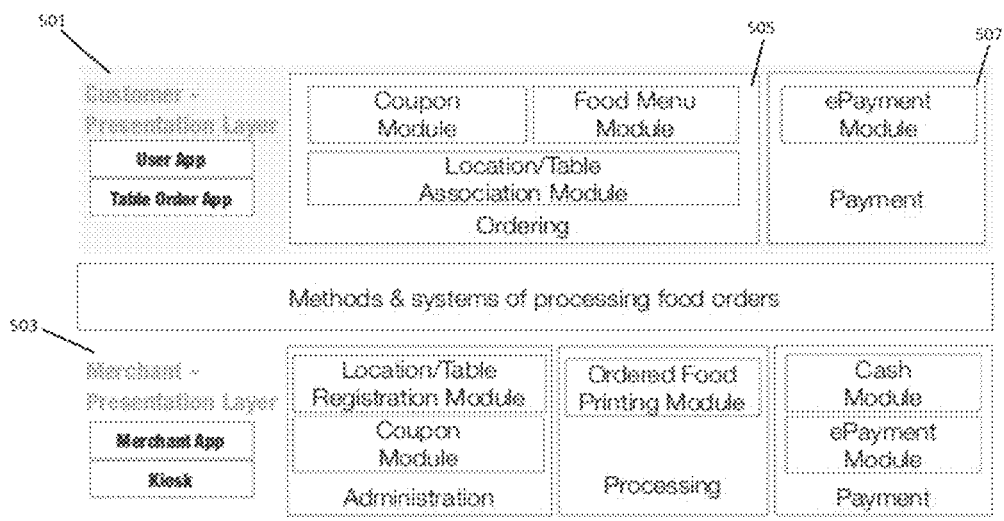
FIG. 5 illustrates that the application is divided into two user groups.

As shown in FIG. 5, the application is divided into two user group. The first user group is the users who can use mobile devices with the user application or the table order application to place order in food order processing system, referring to the customer presentation layer 501 in FIG. 5. The user side mainly involves two components: ordering component 505 and payment component 507. The ordering component 505 enables the user application and table order application to complete food ordering workflow from traditional way to digital way. Whenever the user signs in the user application or not, the user can search the restaurant by the given criteria, browse the food menu and coupon of specific restaurant. While the user has signed in the user application, the user is permitted to add food item to shopping cart, specifying the quantity of customized options, if necessary. After the desired food items are added to the cart, checkout process can go through from the user application to place an order to merchant side in real-time. Any orders placed with the same user account are able to display for tracking the order status and reviewing order details. Besides, the module of location/table association can speed up the restaurant look up process to directly navigate the restaurant page by scanning a QR code previously associated with the restaurant. More importantly, dine-in table identity can also be associated with the shopping cart at the same time so that the order placed can be already specified with the dine-order table. It facilitates the order processing with sufficient information to prepare and serve the food to the user of a correct table.

At last, the user finishes the meal, and can pay the bill of previous incomplete order with built-in supported electronic payment method. If the user does not like to pay with the specific payment method, the user can choose to pay the bill with traditional payment method handled with merchant or self-checkout by the multi-function kiosk, if available.

Figure 6:
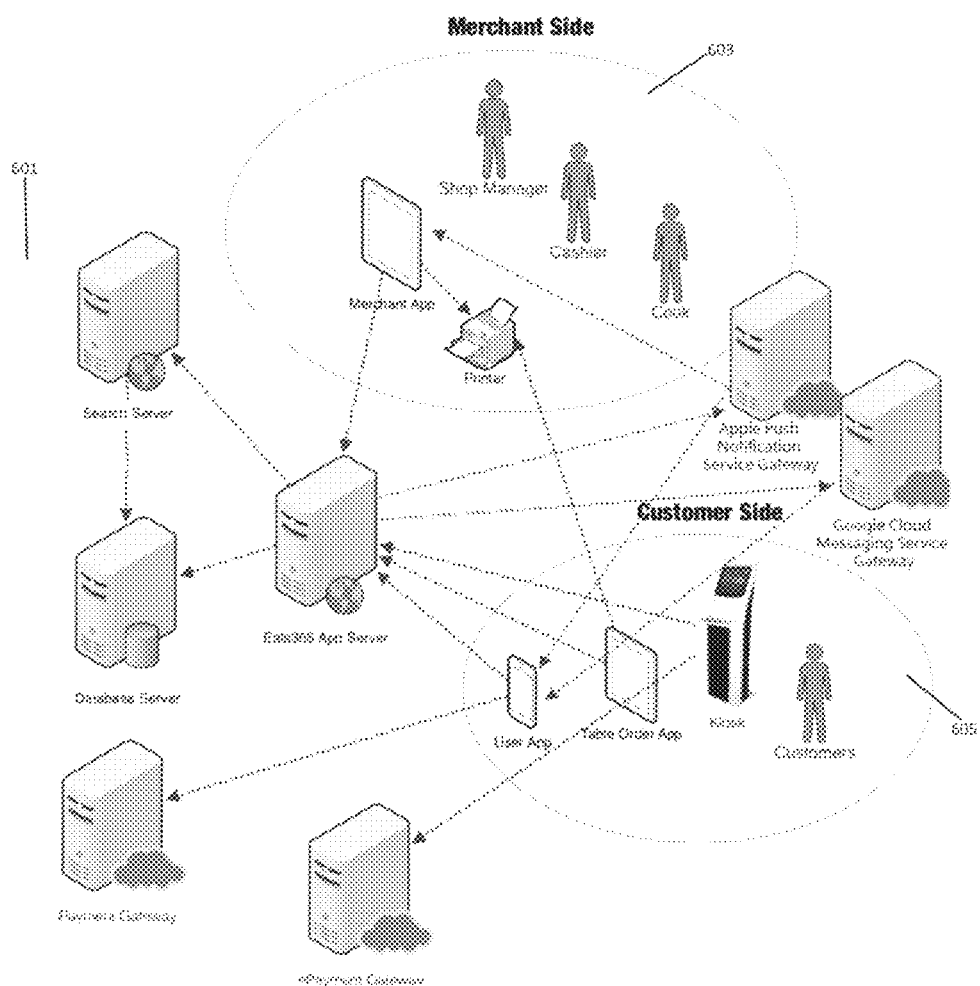
FIG. 6 shows communications among the customer, the merchant and servers of a food order processing system according to an embodiment of the present patent application.

FIG. 6 illustrates the communication between the peripheral devices and the servers. The communication is basically divided into three parts, namely, server side 601, merchant side 603, and customer side 605.

At the merchant side 603, it includes shop workers including shop managers, cashiers and cooks. The shop managers and cashiers maintain the restaurant information and control orders inside the Merchant App which is connected to the cloud. The Merchant App updates for new order list every 10 seconds and illustrates them in graphical view. It also gets the printing queue from Eats365 App Server to control the printing service.

At the customer side 605, there are three applications, Table Order App, User App and Kiosk. Table Order App is an iOS Application in tablet, such as iPad, which is used to take a new order from customers. The menu and shopping cart flow will be all processed in-app. The User App is directly connect to the cloud, and send request to retrieve different information and commands.

At the server side 601, there are three servers supporting the functions of the whole system. The Eats365 App Server is the in-coming and the out-coming port of the system. When the server tries to contact with the User App and Merchant App, it will pass through the APNS Server from Apple and the GCM Server from Google. The Search Server is a server which facilitates the searching query from the App Server. It will output the suitable object by the requirement of the query. The database server contains all information and personal information will be encrypted with RSA algorithm. When the User App processes a payment, it will connect with the payment gateway and send request to the Eats365 App Server.

In the above embodiments, a food order is viewed and/or selected on a mobile device at a restaurant or a remote location. The order is placed when the mobile device registers a location identifier (include, but are not limited to a printed or electronic identifier). The order placed is then transmitted to the restaurant and prepared food is delivered to the identified location.

In the above embodiments, patrons are given the ability to view restaurants menus, select items from the menus and place food orders directly from a mobile device. A registered location identifier allows restaurants to deliver the food order to the identified location. Possible usage of the embodiments includes, but is not limited to:

1. Before reaching a restaurant, patrons can view the restaurant menu on a mobile device, then select dish(es) they like. Once seated at the restaurant, the patrons can scan the location identifier with a mobile device to place their order. Then food is served to the location/table where the orders were placed.
2. Patrons enter a restaurant. Once seated at a table, the patrons can scan the location identifier with a mobile device to identify the restaurant and location, proceed to view the restaurant menu, select and place their orders with a mobile device. Then food is served to the location/table where the order was placed.

In the above embodiments, method and medium of transmission include, but are not limited to:

1. Electronic means through a network, Internet, or private network;
2. Voice or facsimile through a PSTN.

The mobile device includes, but is not limited to: Smartphone, Tablet, Personal Digital Assistant, Mobile Computer, and Wearable Electronics.

While the present patent application has been shown and described with particular references to a number of embodiments thereof, it should be noted that various other changes or modifications may be made without departing from the scope of the present invention.

What is claimed is:

1. A method for food order processing comprising:
   determining, via a processor, a user's current location;
   determining, via the processor, a food preparation premise based on the user's current location;
   invoking, via the processor, a web service to obtain a menu comprising a plurality of dishes capable of being prepared and served by the food preparation premise;
   generating, via the processor, a web service response by caching of the menu on a local memory of a user device to create a local cached menu and
   applying time-based filtering to the local cached menu in order to generate a sub-menu comprising only the dishes available at the time of placing an order;
   displaying, via the processor, the sub-menu associated with the food preparation premise and allowing the user to make a selection of at least one dish from the sub menu;
   allowing, via the processor, the user to place an order based on the selection;
   determining, via the processor, whether the order is associated with a table ID; and processing, via the processor, payment associated with the order; wherein:
if the order is determined to be not associated with a table ID, the method further comprising matching a table ID with the order;
if the user's current location is determined to be a remote site, the method further comprising searching for a food preparation premise; if the user's current location is determined to be a restaurant, the method further comprising matching a location identifier of the restaurant with a food preparation premise; and
the step of processing payment associated with the order comprises determining whether the user chooses to make payment at a cashier register; if yes, choosing an electronic method or cash for the payment method; and if not, scanning a QR code, confirming details of the order, and proceeding to complete the payment at a kiosk.

2. The method of claim 1, wherein the step of matching a location identifier of the restaurant with a food preparation premise comprises scanning a QR code that is associated with the restaurant, and identifying the food preparation premise based on the QR code.

3. The method of claim 2, wherein the step of matching a location identifier of the restaurant with a food preparation premise further comprises associating a table ID specified in the QR code with a shopping cart.

4. The method of claim 1, wherein the step of searching for a food preparation premise comprises retrieving the user's current location by GPS detection, pre-stored geocodes of addresses saved in a user's address list, or keywords.

5. The method of claim 4, wherein the step of searching for a food preparation premise further comprises assigning filters to results returned.

6. The method of claim 1 further comprising locking the order to finalize the order to be paid after the user confirms the details of the order.

7. A method for food order processing comprising:
determining, via a processor, a user's current location;
determining, via the processor, a food preparation premise based on the user's current location;
invoking, via the processor, a web service to obtain a menu comprising a plurality of dishes capable of being prepared and served by the food preparation premise;
generating, via the processor, a web service response by
caching of the menu on a local memory of a user device to create a local cached menu and
applying time-based filtering to the local cached menu in order to generate a sub-menu comprising only the dishes available at the time of placing an order;
displaying, via the processor, the sub-menu associated with the food preparation premise and allowing the user to make a selection of at least one dish from the sub-menu;
allowing, via the processor, the user to place an order based on the selection;
determining, via the processor, whether the order is associated with a table ID; and
processing, via the processor, payment associated with the order; wherein:
if the order is determined to be not associated with a table ID, the method further comprising matching a table ID with the order.

8. The method of claim 7, wherein if the user's current location is determined to be a remote site, the method further comprising searching for a food preparation premise; if the user's current location is determined to be a restaurant, the method further comprising matching a location identifier of the restaurant with a food preparation premise.

9. The method of claim 8, wherein the step of matching a location identifier of the restaurant with a food preparation premise comprises scanning a QR code that is associated with the restaurant, and identifying the food preparation premise based on the QR code.

10. The method of claim 9, wherein the step of matching a location identifier of the restaurant with a food preparation premise further comprises associating a table ID specified in the QR code with a shopping cart.

11. The method of claim 8, wherein the step of searching for a food preparation premise comprises retrieving the user's current location by GPS detection, pre-stored geocodes of addresses saved in a user's address list, or keywords.

12. The method of claim 11, wherein the step of searching for a food preparation premise further comprises assigning filters to results returned.

13. The method of claim 7, wherein the step of processing payment associated with the order comprises determining whether the user chooses to make payment at a cashier register; if yes, choosing an electronic method or cash for the payment method; and if not, scanning a QR code, confirming details of the order, and proceeding to complete the payment at a kiosk.

14. The method of claim 13 further comprising locking the order to finalize the order to be paid after the user confirms the details of the order.

15. A system for food order processing comprising:
a processor; and
a memory communicatively coupled with the processor, wherein the processor executes programmed instructions stored in the memory for
determining a user's current location;
determining a food preparation premise based on the user's current location;
invoking a web service to obtain a menu comprising a plurality of dishes capable of being prepared and served by the food preparation premise;
generating a web service response by
caching of the menu on a local memory of a user device to create a local cached menu and
applying time-based filtering to the local cached menu in order to generate a sub-menu comprising only the dishes available at the time of placing an order;
displaying the sub-menu associated with the food preparation premise and allowing the user to make a selection of at least one dish from the sub-menu;
allowing the user to place an order based on the selection;
determining whether the order is associated with a table ID;
processing payment associated with the order; and
matching a table ID with the order, if the order is determined to be not associated with a table ID.

16. The system of claim 15 further comprising means for searching for a food preparation premise if the user's current location is determined to be a remote site; and means for matching a location identifier of the restaurant with a food preparation premise, if the user's current location is determined to be a restaurant.

17. The system of claim 16 further comprising means for scanning a QR code that is associated with the restaurant, and identifying the food preparation premise based on the QR code; and means for associating a table ID specified in the QR code with a shopping cart.

18. The system of claim 16 further comprising means for retrieving the user's current location by GPS detection, pre-stored geocodes of addresses saved in a user's address list, or keywords.

19. The system of claim 18 further comprising means for assigning filters to results returned.

20. The system of claim 15 further comprising means for determining whether the user chooses to make payment at a cashier register; if yes, choosing an electronic method or cash for the payment method; if not, scanning a QR code, confirming details of the order, and proceeding to complete the payment at a kiosk; and means for locking the order to finalize the order to be paid after the user confirms the details of the order.

* * * * *